Oct. 16, 1923.
M. MAROTZ
GRAIN DRILL
Filed Nov. 1, 1921
1,471,179
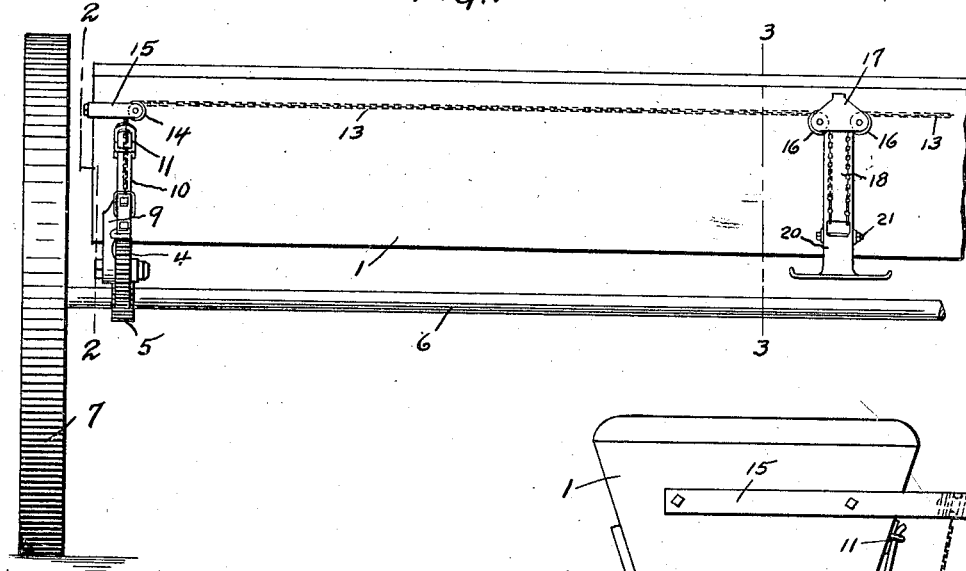
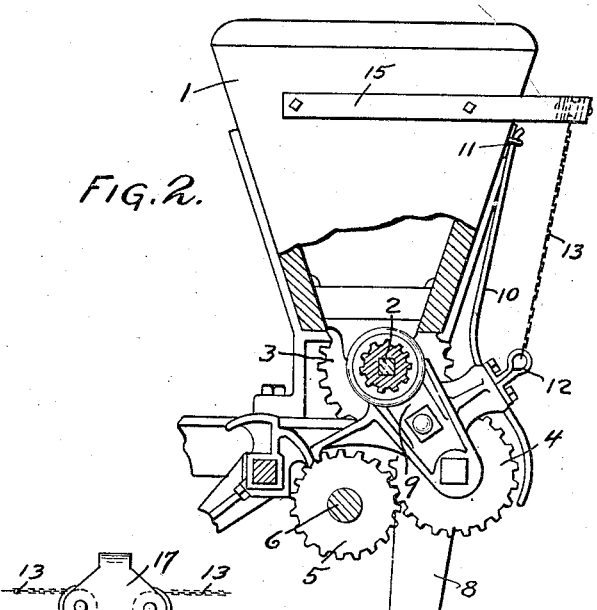
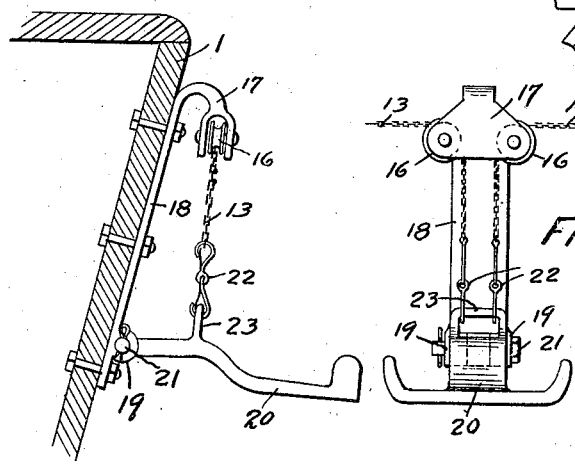
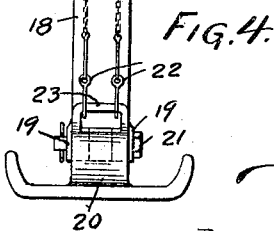
Inventor:
Max Marotz Patented Oct. 16, 1923.

1,471,179

UNITED STATES PATENT OFFICE.

MAX MAROTZ, OF ASHTON, IDAHO, ASSIGNOR OF ONE-HALF TO A. H. WILKIE, OF IDAHO FALLS, IDAHO.

GRAIN DRILL.

Application filed November 1, 1921. Serial No. 512,106.

*To all whom it may concern:*

Be it known that I, MAX MAROTZ, a citizen of the United States, residing at Ashton, in the county of Fremont and State of Idaho, have invented certain new and useful Improvements in Grain Drills; and I do declare the following to be a full, clear, and exact description of the invention, such as will enable others skilled in the art to which it appertains to make and use the same.

This invention relates to an improved operating means for rendering the grain feeding mechanism of a grain drill inoperative when so desired, the operating means being so constructed that it is not necessary to lift the disks out of the ground. By means of this operating mechanism, the feeding may be stopped whenever desired and feeding of the grain can be started again whenever desired. It will thus be seen that when making a turn at the end of a field, it is not necessary to lift the disks out of the ground to prevent feeding of grain at the turn and further the feeding of the seed can be set in operation immediately after the turn is made instead of the feeding of the seed being controlled by the position of the disks with respect to the ground and the feeding started either too soon or too late.

Another object of the invention is to so construct this mechanism that the feeding of the seed may be controlled by a treadle which may be operated by the foot of the person operating the grain drill thereby making it unnecessary to use the hand for controlling the feeding.

This invention is illustrated in the accompanying drawings, wherein:

Figure 1 is a view showing one side portion of a grain drill in rear elevation with the improved mechanism associated therewith.

Figure 2 is a view showing the grain drill partially in side elevation and partially in vertical section.

Figure 3 is a vertical sectional view taken along the line 3—3 of Fig. 1.

Figure 4 is an enlarged view of the treadle mechanism.

The grain drill is provided with the usual grain box 1 having a conventional structure of grain feeding mechanism which includes a rotatable shaft 2 at each end of which is provided a gear 3 engaged by an idler gear 4 which when in an operative position will mesh with a gear 5 carried by the axle 6 which may be termed a drive shaft and carries the supporting wheels 7. When the gears 4 are in the operative position and the grain drill is being moved forwardly, the axle 6 will rotate with the wheels and rotary movement imparted to the shaft 2 so that grain may be fed out through the grain spouts, one of which is shown in Fig. 2 and indicated by the numeral 8 and any number of which may be provided. Adjacent each end of the grain box, there has been provided a bracket 9 which is pivotally mounted upon the shaft 2 and serves as a bearing bracket for the idler gear 4. A spring strip 10 is secured to the grain box as shown at 11 and has engagement with the brackets so that the brackets will be normally held in the position shown in Fig. 2 but may be swung upwardly against the action of the spring to move the gear 4 out of engagement with the gear 5 and thus prevent rotation of the drive shaft 3. An eye 12 is carried by the bracket and engaged by a chain 13 which extends upwardly to engage the pulley wheel 14 carried by the inwardly extending free end portion of the bracket 15 which is secured to the ends of the grain box. After the chain has engaged the pulley wheel 14, the chain is carried toward the center of the grain box and from an inspection of Figs. 1 and 4, it will be seen that the two chains which extend from opposite ends of the grain box are brought into engagement with pulley wheels 16 rotatably mounted in the heads 17 of the bracket 18. This bracket 18 is secured in a vertical position upon the rear face of the grain box and is provided at its lower end with bearing ears 19 between which the foot treadle 20 is pivotally mounted by means of a pivot pin 21. At their lower ends, the chain 13 carries snap hooks 22 having upper hook elements connected with the chain and lower hook elements which engage an eye 23 carried by and extending above the treadle 20. It will be readily seen that when the operator of the grain drill places his foot upon the treadle and pushes downwardly, the chains 13 will be drawn upon and each of these chains will draw the bearing bracket with which it is connected upwardly and cause the gear 4 carried by this bearing bracket to be moved out of engagement with the gear 5 with which it normally engages.

When the grain drill is in use, the grain is placed in the grain box and the drill is driven across the field with the furrow disks embedded in the ground the desired amount. When the end of the field is reached and it is necessary to make a turn, the operator will place his foot upon the treadle 20 and press the treadle downwardly thus causing the bracket 9 at each end to be swung upwardly to render the feeding mechanism of the grain box inoperative. It is therefore not necessary to lift the disks out of the ground. The turn can therefore be made without the furrow opening disk being lifted from the ground and when the drill is again in position to travel across the field, the disks will be embedded in the ground the desired amount, and the seed may be properly deposited. It has been found that where it is necessary to lift the furrow opening disks before making a turn and then again lowering them after the turn is made, the disks do not at first extend into the ground the proper amount and therefore at the end of the field, the grain is not properly placed in the ground. It has also been found that where it is necessary to descend from the driver's seat in order to render the feeding mechanism inoperative, the driver does not always take the trouble to do this and therefore seed is wasted at the turn. When the foot is removed from the treadle after the turn is made, the weight of the gears 4 and brackets 9 will tend to return the brackets to the normal position with the gears 4 engaging the gears 5 and this return will be assisted by the springs 10 which slidably engage the brackets and serve to yieldably hold the brackets against upward swinging movement. There has thus been provided means for controlling the feeding of grain from a grain drill which is so constructed that the feeding mechanism may be rendered inoperative whenever desired and again rendered operative without it being necessary to lift the furrow opening disks from the ground or for the driver to leave the driver's seat of the grain drill.

I claim:

1. A horizontally disposed support, vertically movable elements mounted adjacent the ends of said support, guides carried by the end portions of said support above said movable element, a lever pivotally mounted intermediate the length of said support, guides above said lever, and flexible means connected with said lever and engaged with the guides above the lever and above said movable element and connected with the movable element and serving to impart vertical movement to said element when said lever is moved.

2. An actuating device for the purpose set forth comprising a bearing bracket having its upper end portion extended outwardly and provided with a bearing head, guides carried by said bearing head, a treadle pivotally connected with said bearing bracket adjacent its lower end, and an eye extending upwardly from the treadle whereby flexible elements may be brought into engagement with said guides and have their end portions extended downwardly and connected with the eye of the treadle.

MAX MAROTZ.

Witness:
A. H. WILKIE.